United States Patent [19]

Nagashima et al.

[11] 4,183,132
[45] Jan. 15, 1980

[54] ELASTIC RING FITTING DEVICE

[75] Inventors: Eiji Nagashima, Kofu; Masanori Fukushima, Kushigata, both of Japan

[73] Assignee: Tokico Ltd., Kawasaki, Japan

[21] Appl. No.: 935,317

[22] Filed: Aug. 21, 1978

[30] Foreign Application Priority Data

Aug. 24, 1977 [JP] Japan .................. 52/101414

[51] Int. Cl.$^2$ .................. B29P 11/02
[52] U.S. Cl. .................. 29/451
[58] Field of Search .................. 29/451, 235

[56] References Cited

U.S. PATENT DOCUMENTS

| | | | |
|---|---|---|---|
| 3,406,441 | 10/1968 | Larsson | 29/451 |
| 3,553,817 | 1/1971 | Lallak | 29/235 |
| 3,990,138 | 11/1976 | Bellia | 29/451 |
| 4,091,521 | 5/1978 | Dygert | 29/235 |
| 4,141,129 | 2/1979 | Martini | 29/235 |

*Primary Examiner*—James L. Jones, Jr.

*Attorney, Agent, or Firm*—Wenderoth, Lind & Ponack

[57] ABSTRACT

A device for fitting an elastic ring such as a piston seal, O-ring or the like into an inner circumferential groove of an article such as a hydraulic cylinder or the like. The device comprises a support supporting the article, a tubular retaining member having an inner circumferential groove, means supplying the elastic ring transversely into the groove of the retaining member through a cut-out portion formed in the retaining member, a chucking member adapted to be inserted into the retaining member and into the article for receiving the elastic ring from the retaining member and delivering the elastic ring into the article, means for deforming elastically at least a portion of the elastic ring radially inwardly in delivering the elastic ring from the retaining member to the chucking member, and a clamping mechanism provided on the chucking member for clamping the elastically deformed ring in translating the chucking member from the retaining member to the article.

6 Claims, 7 Drawing Figures

ELASTIC RING FITTING DEVICE

BACKGROUND OF THE INVENTION

This invention relates to method and apparatus for fitting an elastic ring such as a piston seal, a rubber ring, an O-ring or the like into an inner circumferential groove of an article such as a cylinder or the like.

Conventionally, the resilient ring of the type aforementioned has been fitted manually into the groove of the article, because, the configuration of the ring changes easily and it has been difficult to automatically fit the ring into the groove. Further, the ring has sometimes been fitted in a considerably recessed or deep location in the article and, a plurality of rings have sometimes been arranged in axially spaced grooves in a bore of the article, in such cases, particularly when the ring is fitted at a location which is not accessible by fingers of the worker, fitting operation is troublesome and time consuming.

SUMMARY OF THE INVENTION

An object of the present invention is to provide a method and apparatus for automatically fitting one or more elastic rings in one or more inner circumferential grooves in an article thereby solving difficulties in prior art manual fitting operation and improving reliability of fitting operation and increasing working efficiencies.

According to the present invention there is provided a method for fitting an elastic ring into an inner circumferential groove of an article, and which method comprises steps of inserting the elastic ring into an inner circumferential groove formed in a tubular retaining member through a cut-out portion which connects the groove with the outside of the retaining member, inserting a chucking member axially into the tubular retaining member, deforming at least a portion of the resilient ring in radially inward direction by inserting a pushing member into the retaining member through the cut-out portion, clamping the deformed ring by a chucking mechanism provided on the chucking member, inserting the chucking member with the ring being retained thereon into the article so as to locate the ring registering the annular groove in the article, and releasing the ring from the chucking mechanism whereby the ring is fitted into the groove of the article by elastic force of itself.

BRIEF DESCRIPTION OF THE DRAWINGS

Further objects and advantages of the present invention will appear more clearly from the following description with reference to the drawings, in which.

DETAILED DESCRIPTION OF THE PREFERRED EMBODIMENTS

Figure 1:
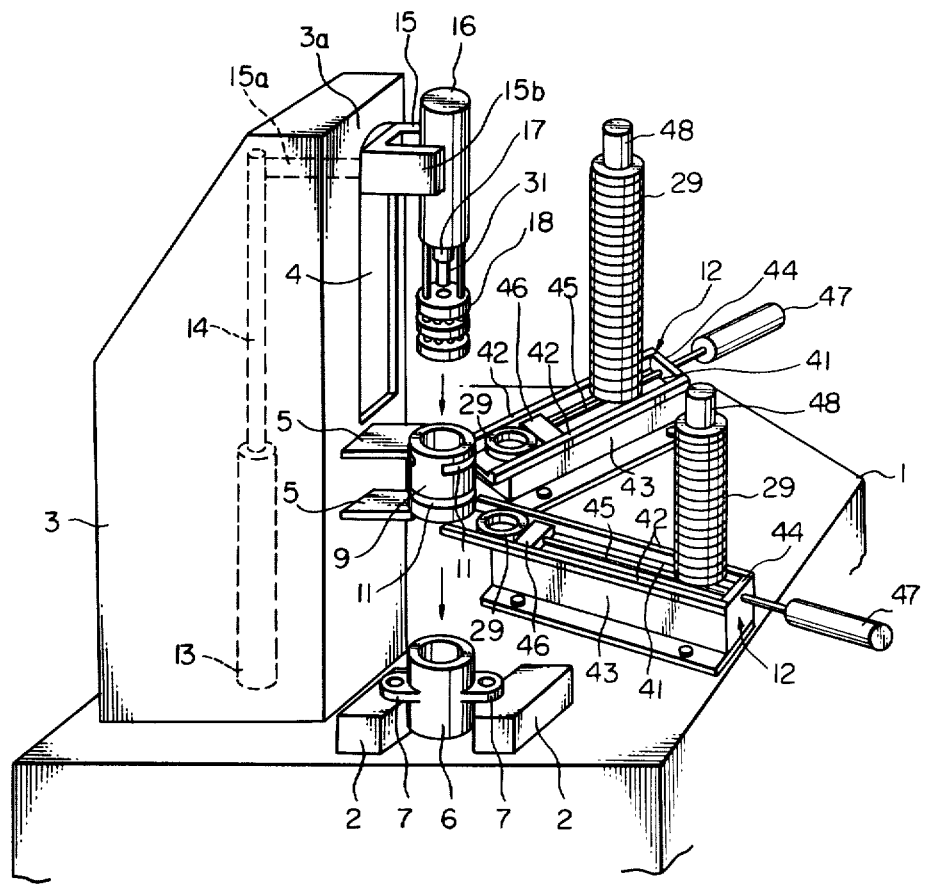
FIG. 1 is a schematic perspective view of an elastic ring fitting apparatus according to the present invention.
Figure 2:
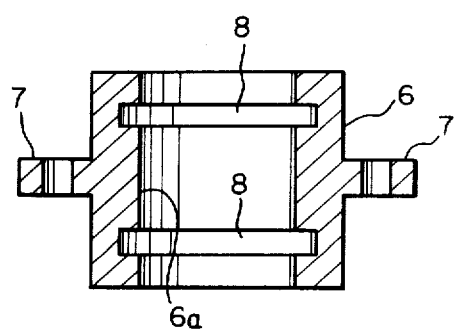
FIG. 2 is a longitudinal section of an article into inner circumferential grooves of which the resilient rings are fitted.

The embodiment shown in FIGS. 1-5 comprises a base 1 having two supporting blocks 2 secured thereon with a predetermined space therebetween, and a generally parallelepiped hollow member or stand 3 as shown in FIG. 1. A vertically elongated opening or slot 4 is formed in a front side wall of the stand 3 facing the supporting blocks 2, and retainer supporting plates 5 are secured to the front side wall of the stand 3 at predetermined positions thereof. An article 6 having a cylindrical bore 6a, inner circumferential grooves 8 into which annular elastic rings 29 (described hereinafter) are fitted according to the invention, and fitting plates 7, as shown in FIG. 2, is mounted on the supporting blocks 2 with the longitudinal axis of the article 6 being in the vertical direction. The article 6 shown in the embodiment has two grooves 8 therein, but the invention may be applied to articles having any desired number of grooves 8. A tubular retaining member 9 is secured to the retainer supporting plates 5 with the longitudinal axis thereof aligning with that of the article 6 and upperside of the article 6. The retaining member 9 has a bore 9a the diameter of which being equal to that of the bore 6a of the article 6, and inner circumferential grooves 10 the width, and the axial spacing therebetween being equal to that of the grooves 8 of the article 6. The grooves 10 are respectively communicated with the outer surface of the retaining member 9 through transverse cut-out portions 11 respectively. The width or the axial spacing (as viewed in FIG. 1) of the cut-out portions 11 are preferably equal to that of the grooves 10. The cut-out portions extend transversely or in the radial direction from the bottom of the groove 10, and extend in the circumferential direction preferably along a half-circle so as to receive the elastic rings 29 into the grooves 10 smoothly by means of elastic ring supplying devices 12 (explained in detail hereinafter). The cut-out portions 11 in the embodiment are respectively formed to face respective supplying devices 12. Further, the cut-out portion 11 may be formed to taper in the radially inward direction so as to receive the ring 29 smoothly from the supplying device 12.

Figure 3:
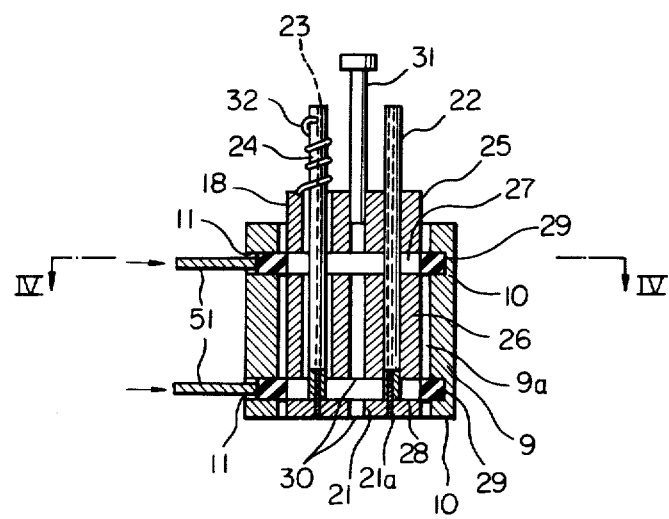
FIG. 3 is a sectional view of the retaining member of FIG. 1 with the elastic rings and the chucking member being fitted therein.
Figure 4:
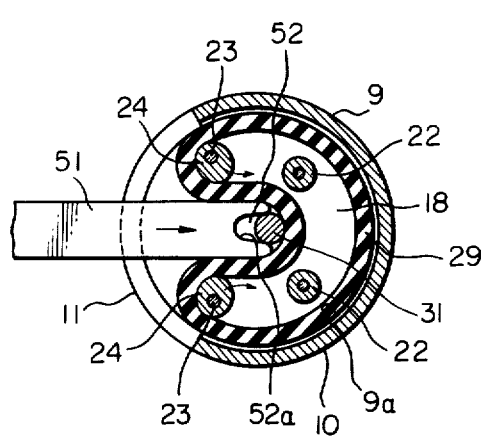
FIG. 4 is a cross-sectional view taken generally along line IV—IV in FIG. 3 but showing an elastic ring being deformed and chucked by chucking mechanism.
Figure 5:
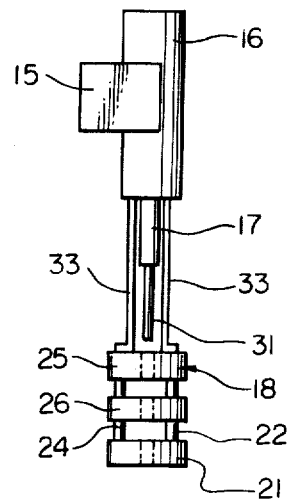
FIG. 5 is a side elevational view of the chucking member and the retaining member.

A hydraulic or pneumatic cylinder 13 is mounted in the stand 3 with a piston rod 14 thereof extending in the vertical upward direction. A connecting rod 15a of a clevis member 15 is secured to the upper end of the piston rod 14 and passes through the vertically elongated opening 4 of the stand 3 to slide in the vertical direction in response to actuation of the cylinder 13. A hydraulic or pneumatic cylinder 16 is secured to the clevis member 15 with piston rod 17 thereof extending vertically downward in aligning with the retaining member 9 and the article 6. A chucking member 18 is mounted on the lower end of the cylinder 16. The chucking member 18 comprises, as shown in FIGS. 3-5, three vertically spaced, lower, central and upper discs 21, 26 and 25 secured each other by means of two vertically extending supporting columns 22, a connecting member 33 connecting the upper disc 25 to the lower end of the cylinder 16, and two cam supporting shafts 23 secured to the lower disc 21 to extend vertically upward for supporting rotatably therearound column shaped cams 24 of generally oval cross-section. In the embodiment, the cams 24 have uniform cross-section and freely rotate in respective bores (not shown) formed in the central and upper discs 26 and 25, but it is possible to omit the shafts 23 by forming on the cams 24 journal portions having circular cross-section for supporting rotatably the cams 24 with respect to the discs 21, 26 and 25, and cam portions formed between respective journal portions. The diameter of each of the discs 21, 26 and 25 is smaller than the inner diameter of the resilient ring 29 so that the chucking member 18 can freely pass through the rings 29 located in grooves 10 of the retaining member 9. The width or the axial length of spacings 27 and 28 defined between the upper and the central discs 25 and 26 and between the central and lower discs 26 and 21 are equal to that of the grooves 10 in the retaining member 9, and the axial length of the central disc 26 is equal to axial spacing between the grooves 10 in the retaining member 9. There is provided torsion springs 32 (only one is shown in FIG. 3) to bias the cams 24 in the directions opposite to arrow directions in FIG. 4. Further, there is formed in respective discs 25, 26 and 21 vertical holes 30 passing through the discs in registering relationship respectively to receive slidably therein a clamping rod 31 the upper end of which is secured respectively to the piston rod 17 of the cylinder 16.

There is provided two resilient ring supplying devices 12 secured on the base 1 for supplying the resilient rings 29 to the grooves 10 of the retaining member 9 through cut-out portions 11. Each of the supplying devices 12 includes a guide member 41 having a generally horizontal oblong top surface and two guide flanges 42 extending along opposite longitudinal sides of the top surface, a support 43 secured to the base 1 for supporting the associated parts of the supplying device 12, a push-out plate 46 slidably disposed on the guide member 41 and connected to a hydraulic or pneumatic cylinder 47 through a push rod or piston rod 45 extending along the longitudinal axis of the device 12, and a resilient ring storing column 48 mounted above the guide member 41 and on the support 43 or the base 1 through mounting means (not shown). The supplying devices 12 are arranged such that the longitudinal axis thereof extend in radial directions with respect to the common vertical axis of the retaining member and the cylinder 16, and the rings 29 supported on respective guide members 41 align respectively with the upper and lower cut-out portions 11 in the retaining member 9. Further, there is provided two pushing members 51 (FIG. 3) and associated actuators (not shown). The pushing members 51 are adapted to pass through respective cut-out portions 11 and to engage with respective elastic rings 29 for forcibly deforming the rings as shown in FIG. 3. Each pushing member 51 is a generally plate-like member having recesses 52 in the tip ends thereof for allowing the clamping rod 31 passing through the spaces defined between the elastic rings 29 and the tip ends of the member 51. The pushing members 51 may be provided on the tip ends of the piston rods 45 of the cylinders 47 so as to serve pushing out function of the push-out plates 46 and ring deforming function, but, as shown in FIG. 3, the pushing members 51 are preferably located between two cams 24 under the reason which will be described hereinafter.

Operation of the ring fitting device will now be explained. In FIG. 1, the clevis member 15 is ascended to the uppermost position with the chucking member 18 being located out of the retaining member 9, and the piston rod 17 of the cylinder 16 being in the retracted position so that the lower end of the clamping rod 31 is located in the upper disc 25. At that condition, ring supplying devices 12 are actuated to supply elastic rings 29 into the retaining member 9. Respective one elastic rings 29 drop onto guide members 41 and are pushed out of the guide member 41 by means of associated cylinders 47, piston rods 45 and push-out plates 46, and are inserted through cut-out portions 11 into the grooves 10 of the retaining member 9. Then, the cylinder 13 is actuated to descend the chucking member 18 bodily with the cylinder 16 and the clevis member 15 so that the spacings 27 and 28 are located to align with the grooves 10 in the retaining member and elastic rings 29 received therein, as shown in FIG. 3.

The pushing members 51 are inserted through cut-out portions 11 into the spacings 27 and 28 in the chucking member 18. A portion of the circumference of each elastic ring 29 located in the groove 10 of the retaining member 9 is deformed elastically and radially inwardly, as shown in FIG. 3, and radially inner surface portions of the ring 29 will contact the supporting columns 22 (although the ring does not contact yet with the columns 22 in the drawing) and the cams 24. The cams 24 rotate around corresponding cam supporting shafts 23 in the directions shown in arrow lines in the drawing so as to assist the elastic deformation of the elastic rings 29. When the rings 29 are deformed sufficiently the cylinder 16 is actuated to insert the clamping rod 31 into the holes 30 of the chucking member 18. The pushing members 51 are retracted from the spacings 27 and 28. The rings 29 are retained by the columns 22, cams 24 and the clamping rod 31 and are cleared from the grooves 10 in the retaining member 9.

The cylinder 13 is again actuated to further descend the clevis member 15 and the cylinder 16 secured thereto. The chucking member 18 mounting the rings 29 clamped therearound passes through the retaining member 9 and is inserted into the article 6. The descending movement of the chucking member 18 stops at a position where the rings 29 retained thereon align respectively with annular grooves 8 of the article 6. The cylinder 16 is actuated to extract the clamping rod 31 from the holes 30 in the chucking member 18, whereby the elastic rings 29 are released and return to their original annular configuration according to elastic force stored therein and engage with the grooves 8. At that time, cams 24 being biassed by torsion springs 32 move in the directions opposite to arrow directions in FIG. 3 to assist the elastic restoring movement of the rings 29, thus, the rings 29 are fitted smoothly and rapidly into the grooves 8.

Then, the cylinder 13 is actuated to ascend the clevis member 15 and the cylinder 16. The chucking member 18 moves out of the article 6, passes through the retaining member 9 and returns to the original or inactuated position shown in FIG. 1. The article 6 having elastic rings 29 fitted in the grooves 8 thereof is removed from the supporting blocks 2, and a new article 6 is mounted on the blocks 2. Thus, one cycle of ring fitting operation has completed, and a new fitting cycle can be performed similarly.

Figure 6:
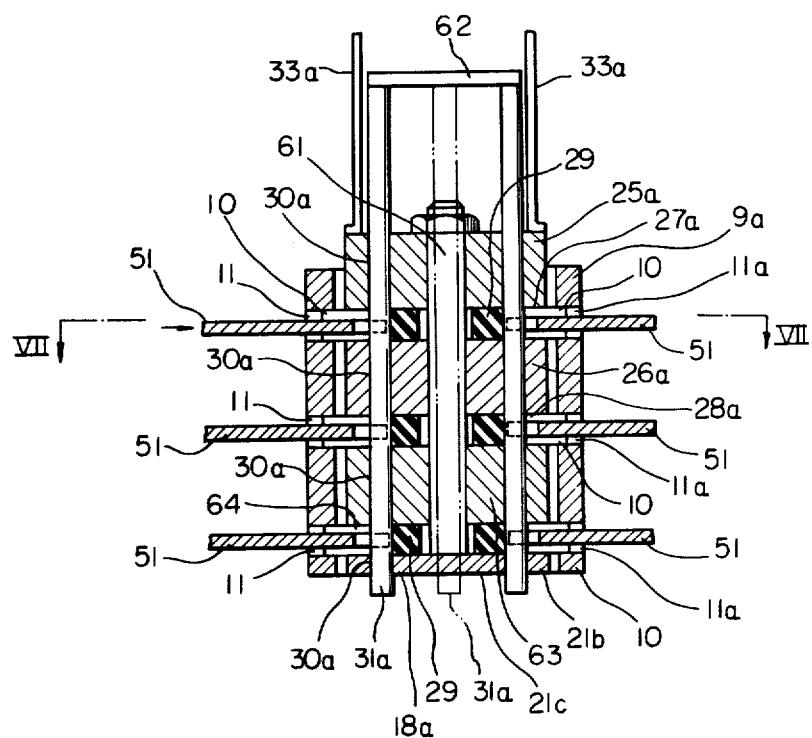
FIG. 6 is a modified form of the chucking mechanism and the retaining member.
Figure 7:
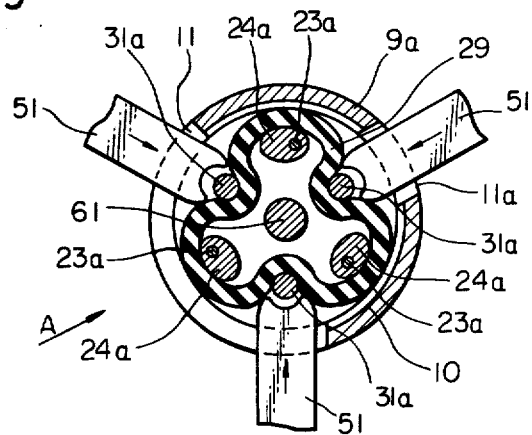
FIG. 7 is a cross-sectional plan view taken along line VII—VII in FIG. 6.

FIGS. 6 and 7 show a modified form of the present invention. A chucking member 18a shown in the drawings is adapted to fit three elastic rings 29 simultaneously into corresponding inner circumferential grooves formed in an article (not shown) such as a hydraulic cylinder or the like, and comprises, four overlappingly disposed equal diameter discs 25a, 26a, 64 and 21b which are connected one another by a connecting rod 61 passing therethrough at the center thereof. The discs define therebetween axial spacings 27a, 28a and 64 which are adapted to receive therein elastic rings 29 respectively. Three cam supporting shafts 23a are secured to the lowermost disc 21b of the chucking member 18a for supporting rotatably thereon oval shaped column-like cams 24. There is formed in remaining discs 25a, 26a and 64 through holes (not shown) for receiving rotatably the cams 24. Further, there is formed in each of the discs 25a, 26a, 64 and 21b three circumferentially spaced through holes 30a aligned in registering relationship in the vertical direction so as to receive slidably therein three clamping rods 31a, with the upper end of each of the rods 31a being connected to a connecting plate 62 which, in turn, is connected to the lower end of the piston rod 17 of the piston 16 (FIG. 5). The holes 30a are located radially inwardly with respect to the cams 24 and, preferably, between circumferentially adjacent cams 24 respectively as shown in FIG. 7. The uppermost disc 25a is connected to the lower end of the cylinder 16 through connecting members 33 with the discs 25a, 26a, 64 and 21b being aligned in registering relationship with the cylinder 16 in the vertical direction. Similar to the first embodiment, the chucking member 18a cooperates with a retaining member 9a having three inner circumferential grooves 10 corresponding to the spacings 27a, 28a and 64 of the chucking member 18a. The elastic rings 29 are supplied transversely into the grooves 10 through cut-out portions 11 (in the direction of arrow A in FIG. 7) by suitable ring supplying devices (not shown). Preferably, there is disposed a single ring supplying device similar to either of the devices 12 in the first embodiment but is displaceable in the vertical direction so as to supply three elastic rings 29 one by one into the grooves 10 in the retaining member 9a. The chucking member 18a is inserted into the retaining member 9a and through the rings 29 retained therein by actuating the cylinder 13 (FIG. 1) with the piston rod 17 of the cylinder 16 (FIG. 1) being in the retracted position or the clamping rods 31a being in the uppermost position.

With the spacings 27a, 28a and 64 of the chucking member 18a being aligned in registering relationship with respective elastic rings 10 located in the grooves 10 in the retaining member 9a, three pushing members 51 are actuated radially inwardly with respect to each of the elastic rings 29 in the retaining member 9 to deform three circumferentially spaced portions of the ring 29 radially inwardly as shown in FIG. 7. The pushing members 51 are connected to one or more suitable actuators (not shown). The pushing members pass through the cut-out portion 11 or an exclusive cut-out portion 11a formed in the wall of the retaining member 9a. In the tip end of each of the pushing members 51 there is formed a recess for allowing each of the clamping rods 31a passing thereacross in the vertical direction.

When the pushing members 51 have been inserted sufficiently into spacings 27a, 28a and 64 of the chucking member 18a the cylinder 16 is actuated to extend the piston rod 17 and to descend the clamping rods 31. The elastic rings 29 are retained on the clamping member 18a with three circumferentially spaced outer diameter portions engaging the clamping rods 31 and three circumferentially spaced inner diameter portions engaging the cams 24. The pushing members 51 are moved radially outward, and the cylinder 13 (FIG. 1) is again actuated to translate the chucking member 18a from the retaining member 9a to the article 6. With the elastic rings 29 being aligned in registering relationship with respective inner circumferential grooves in the article 6, the cylinder 16 is actuated to ascend the clamping rods 31a for releasing the rings 29. The rings 29 restore the annular configuration and are fitted into the grooves of the article 6 by elastic restoring force of themselves.

From the foregoing it can be seen that the objects of this invention have been obtained. One or more elastic rings can be fitted into the inner circumferential grooves of the article easily, rapidly and reliably according to the present invention. The fitting operation can be performed automatically by providing a suitable control system, thus, the operation can be applied continuously to a plurality of articles. Therefore, problems in prior art manual fitting operation can be solved. The elastic ring is retained mechanically on the chucking member in delivering the elastic ring into the article without utilizing vacuum sucking method or the like, thus, the elastic ring is retained reliably on the chucking member.

The foregoing disclosure and description of the invention are illustrative and explanatory thereof. Various changes in the size, shape and materials, as well as the arrangement and details of the illustrated construction may be made within the scope of the appended claims without departing from the spirit of the invention.

What is claimed is:

1. A method for fitting an elastic ring such as a piston seal, an O-ring or the like into an inner circumferential groove of an article such as a hydraulic cylinder or the like, said method comprises steps of inserting transversely the ring into an inner circumferential groove of a tubular retaining member through a cut-out portion of the retainer, inserting axially a chucking member into the retaining member and the elastic ring retained in the circumferential groove of the retaining member, deforming at least a portion of the circumference of the elastic ring in radially inward direction by inserting a pushing member radially inward of the retaining member through the cut-out portion and into an axial spacing of the chucking member, clamping the deformed elastic ring on the chucking member, extracting axially the chucking member with the resilient ring clamped thereon out of the retaining member and inserting into the article so as to locate the elastic ring clamped on the chucking member align with an inner circumferential groove of the article, and releasing the elastic ring from the chucking member whereby the elastic ring is fitted into the groove of the article by elastic restoring of itself.

2. A device for fitting an elastic ring such as a piston seal, an O-ring or the like into an inner circumferential groove of an article such as a hydraulic cylinder or the like, said device comprises a support for supporting the article, a tubular retaining member having an inner circumferential groove corresponding to that of the article, a cut-out portion formed in the retaining member and connected to the groove for passing the elastic ring therethrough in supplying the ring into the groove of the retaining member, a chucking member having a clamping mechanism and being adapted to be inserted into the retaining member having the elastic ring therein, a pushing mechanism for elastically deforming at least a portion of the circumference of the elastic ring retained in the groove of the retaining member in the radially inward direction so as to push the elastic ring into the chucking member, said clamping mechanism being adapted to clamp the deformed elastic ring in the retaining member, and to release the elastic ring from the chucking member when the chucking member is inserted into the article with the elastic ring clamped thereon being aligned in registering relationship with the circumferential groove of the article whereby the elastic ring is fitted into the groove of the article by elastic restoring force of itself.

3. An elastic ring fitting device as set forth in claim 1 further comprising ring supplying means for supplying elastic ring into the circumferential groove of the retaining member.

4. An elastic ring fitting device as set forth in claim 1 wherein the article supported on the support, the retaining member, and the chucking member are arranged along a common vertical axis, and the chucking member moves along the common axis with respect to the stationary and axially spaced retaining member and the article.

5. An elastic ring fitting device as set forth in claim 1 wherein said chucking member comprises a plurality of axially spaced discs with the diameter of which being smaller than the inner diameter of the elastic ring, said discs define therebetween a spacing corresponding the axial width of the elastic ring.

6. An elastic ring fitting device as set forth in claim 5 wherein said chucking member further comprises a clamping rod retractably projecting into the spacing so as to engage a portion of the outer circumference of the elastic ring.

* * * * *